(12) United States Patent
Kino et al.

(10) Patent No.: US 6,172,789 B1
(45) Date of Patent: *Jan. 9, 2001

(54) LIGHT SCANNING DEVICE AND CONFOCAL OPTICAL DEVICE USING THE SAME

(75) Inventors: Gordon S. Kino, Stanford, CA (US); David L. Dickensheets, Bozeman, MT (US)

(73) Assignees: The Board of Trustees of the Leland Stanford Junior University, Palo Alto, CA (US); Olympus Optical Co., Ltd., Tokyo (JP)

(*) Notice: Under 35 U.S.C. 154(b), the term of this patent shall be extended for 0 days.

This patent is subject to a terminal disclaimer.

(21) Appl. No.: 09/231,439

(22) Filed: Jan. 14, 1999

(51) Int. Cl.$^7$ .................................................. G02B 26/08
(52) U.S. Cl. ..................... 359/212; 198/199; 198/201; 198/202; 198/223; 198/225; 198/368
(58) Field of Search ...................... 359/196–226, 359/364–366, 726–732, 850, 857–859, 368, 369; 385/27, 28, 88, 89

(56) References Cited

U.S. PATENT DOCUMENTS

| 5,159,495 | * | 10/1992 | Hamblen | 359/731 |
| 5,546,214 | * | 8/1996 | Black et al. | 359/203 |
| 5,742,419 | * | 4/1998 | Dickenshetts et al. | |

* cited by examiner

*Primary Examiner*—James Phan
(74) *Attorney, Agent, or Firm*—Frishauf, Holtz, Goodman, Langer & Chick, P.C.

(57) ABSTRACT

A light scanning type confocal optical device comprises a light source section, a light transmitting section, a light scanning section, and a processing section. The scanning section includes a movable mirror, a fixed mirror and a converging lens. The movable mirror has an opening at the center, and is supported to be swingable about at least one axis. The fixed mirror is fixedly supported by an optically transparent plate. Reflection surfaces of the movable and fixed mirrors are located opposed to each other. The transmitting section includes an optical fiber having a core, whose end face substantially functions as a confocal pinhole. The light from the end face of the core is, upon passing through the opening, reflected by the fixed mirror toward the movable mirror. The light from the fixed mirror is then reflected by the movable mirror, and is converged by the converging lens onto an object surface.

9 Claims, 5 Drawing Sheets

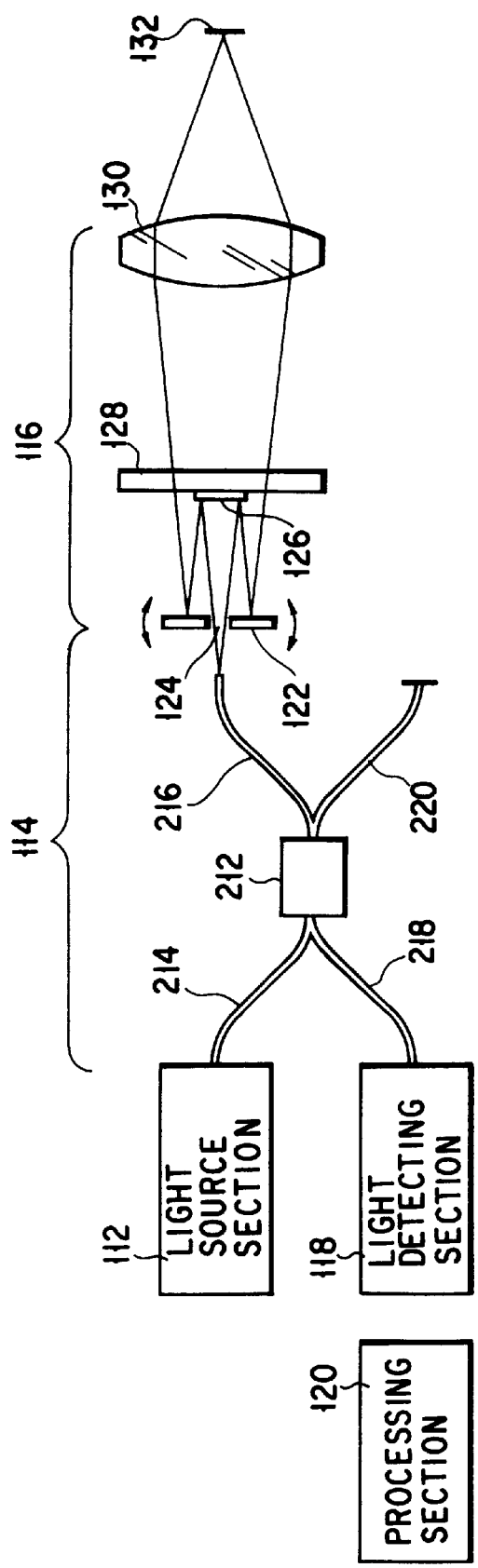
F I G. 1

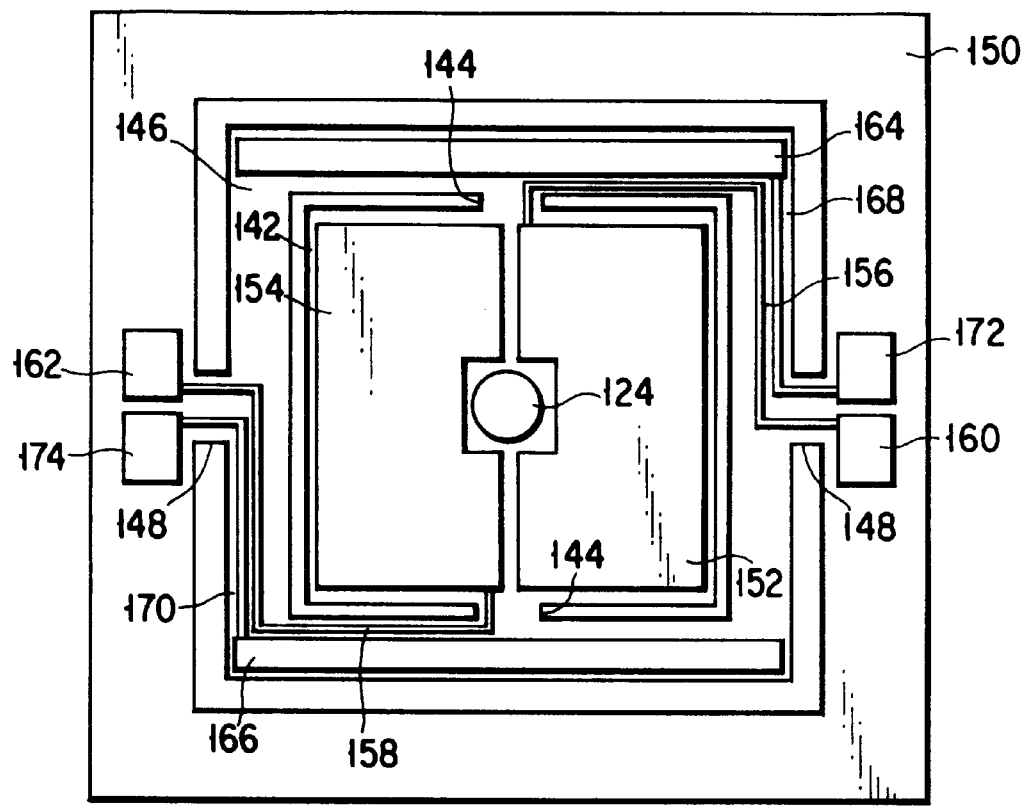
F I G. 2
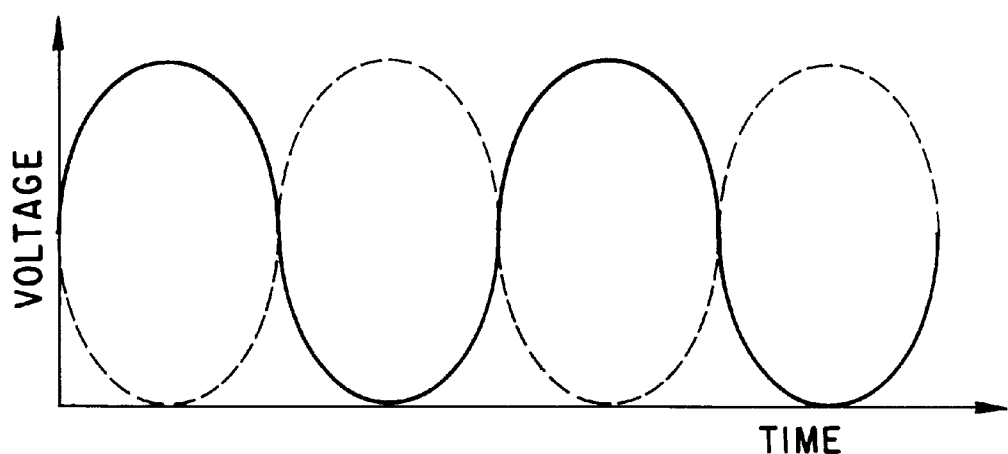
F I G. 3

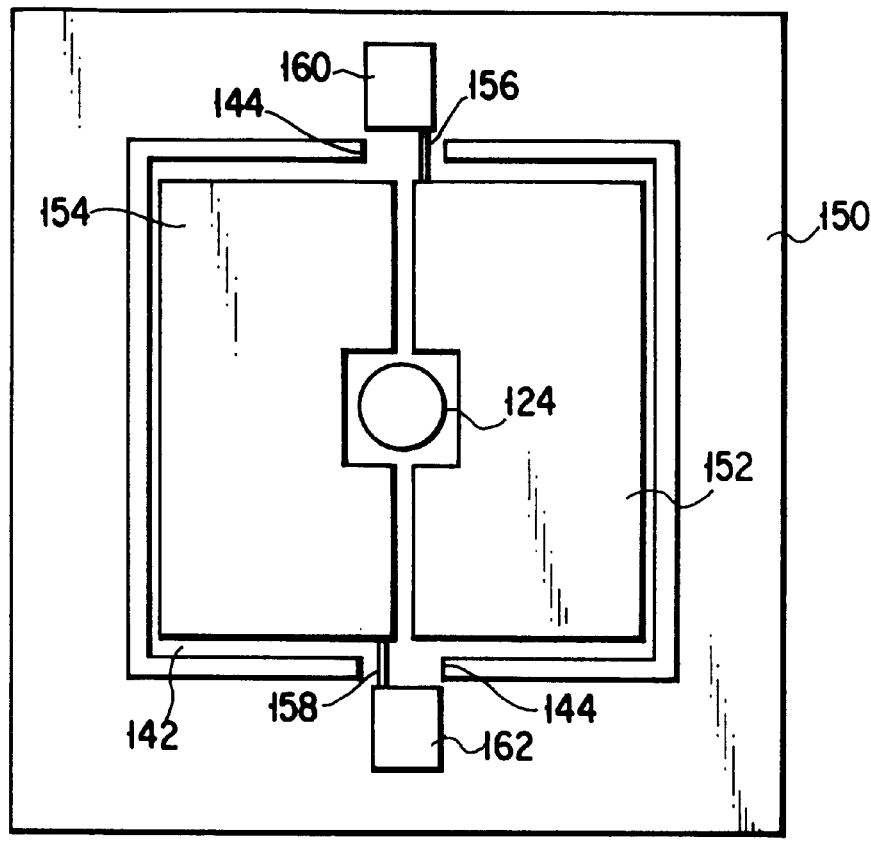
F I G. 4
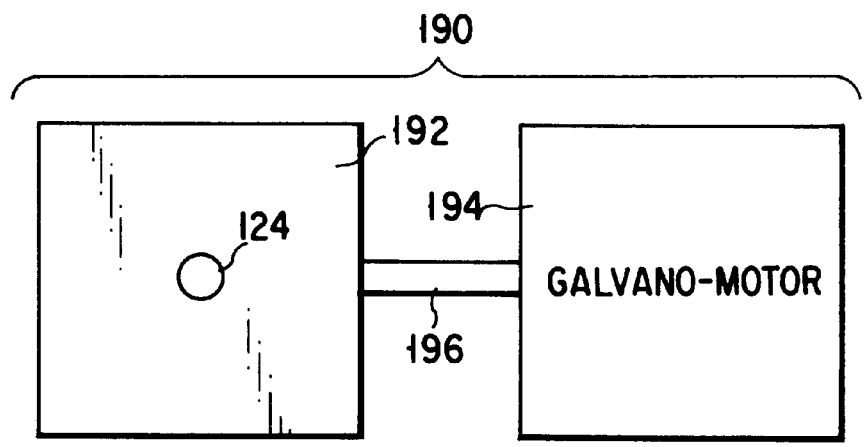
F I G. 5

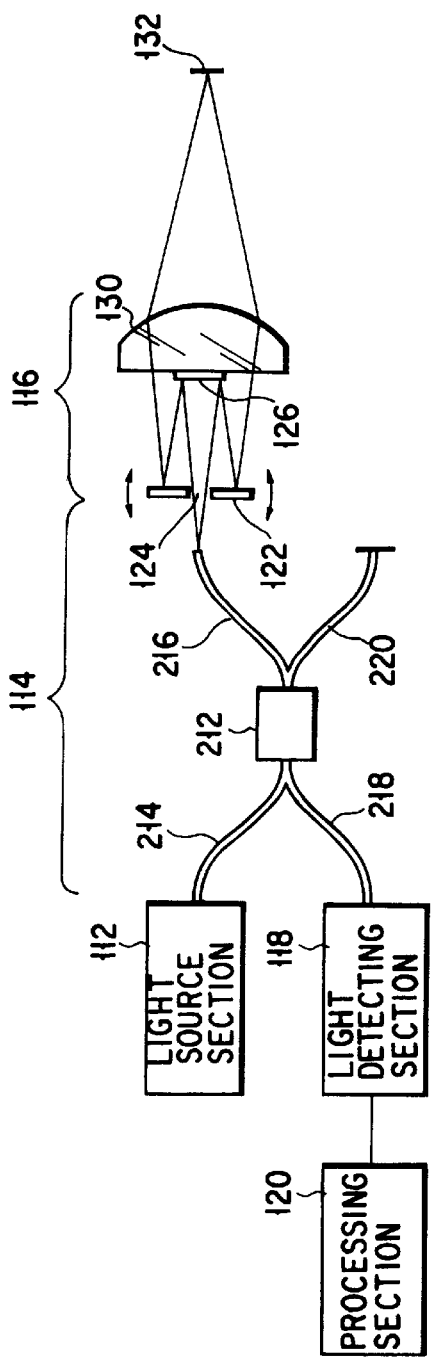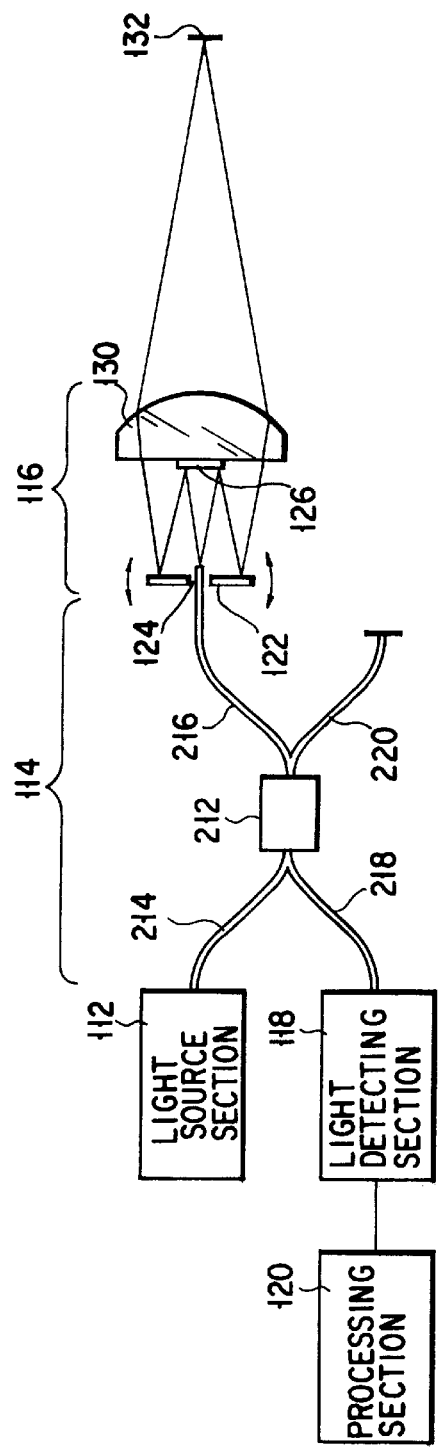
F I G. 6
F I G. 7

LIGHT SCANNING DEVICE AND CONFOCAL OPTICAL DEVICE USING THE SAME

BACKGROUND OF THE INVENTION

The present invention relates to a light scanning type confocal optical device, which scans light emitted from a light source over the surface of an object, and detects light reflected from the surface or fluorescence, and also relates to a light scanning device applied to the optical device.

In recent years, the light scanning type confocal optical microscope has been known as means for minutely observing living tissue or the surface or the inside of cells. The confocal optical microscope has a resolving power exceeding that of an ordinary optical system and, in addition, can obtain a three-dimensional image. However, an ordinary confocal optical microscope has a large optical system, and can not practicably be inserted into the living body. Thus, in general, living tissue is removed from the body in order for the tissue to be observed with the ordinary confocal optical microscope.

In order to overcome this disadvantage, a smaller optical system of a light scanning type micro-confocal microscope is disclosed in the literature "Micromachined scanning confocal optical microscope" (OPTIC LETTERS, Vol. 21, No 10, May, 1996) or U.S. Pat. No. 5,742,419.

The literature suggests the possibility with which a three-dimensional image could be obtained in real time. To be more specific, the above light scanning type micro-confocal microscope, as shown in FIG. 8, comprises a light source 1, a light transmitting section 2, a light detecting section 3, a light scanning section 4, and a processing section 5. The light transmitting section 2 has a single mode fiber. The light scanning section 4 is inserted into the living body through an endoscope. By virtue of this, a three-dimensional image of the inside of the living body could be obtained in real time.

FIG. 9 shows the structure of the light scanning section 4. In the light scanning section 4, a laser light is emitted from the light source 1, and transmitted through the single mode fiber 10. Then, it is reflected by a reflection surface 11, and deflected in an X direction by an electrostatic mirror 12 for scanning light in the X direction. Thereafter, it is totally reflected by a reflection portion 14, deflected in a Y direction by an electrostatic mirror 13 for scanning light in the Y direction, and then converged onto an object surface 16 by a diffraction lens 15.

An end face of the single mode fiber 10 has a conjugate relationship with the object surface 16. Accordingly, the light reflected from the object surface 16 turns back on the above optical path, and converges on the end face of the single mode fiber 10. To be more specific, the light reflected from the object surface 16 is incident on the diffraction lens 15, and thereafter reflected successively by the electrostatic mirror 13, the reflection portion 14, the electrostatic mirror 12, and the reflection surface 11 in that order. Then, it is converged on the end face of the single mode fiber 10 by a converging function of the diffraction lens 15. The converged light is transmitted through the single mode fiber 10 of the light transmitting section 2, and detected by the light detecting section 3.

The above optical system composes a confocal optical system, since the end face of the core of the single mode fiber 10 functions as a pinhole. Thus, scattered light from that portion of the object surface 16 which excludes a convergence point is sufficiently weak in intensity at the end face of the fiber 10, and hardly detected by the light detecting section 3.

Therefore, the above optical system has high resolution in a horizontal direction (XY direction) of the object surface 16 and a depth direction (Z direction) of the object surface 16, as compared with the ordinary optical system. In other words, it has higher longitudinal and transverse resolving powers than the ordinary optical system.

The above light scanning type micro-confocal optical microscope has a lower resolving power than the ordinary confocal optical microscope; however, its resolving power is sufficient for diagnosis involving observation of an internal organ or the like. In addition, the micro-confocal optical microscope has a considerably compact structure.

In insertion of such a micro-confocal optical microscope into the living body through the endoscope to observe the inside of the body, its view direction obliquely crosses its insertion direction. Accordingly, it is difficult to accurately move the object surface 16 in the Z direction only. In other words, the above micro-confocal microscope has bad observational operability.

Furthermore, the conventional micro-confocal microscope uses two reflection surfaces 11 and 14 and two one-dimensional scanning mirrors 12 and 13, in order to achieve two-dimensional scanning. However, use of such a large number of reflection surfaces causes attenuation of light due to reflection performed between the large number of surfaces, thus lowering the detection sensitivity.

BRIEF SUMMARY OF THE INVENTION

The present invention has been made to overcome the above disadvantages. An object of the invention is to provide a light scanning type compact confocal optical device, which has the view direction coincident with the insertion direction, thus improving the operability.

Another object of the invention is to provide a light scanning device, which allows realization of such a compact confocal optical system.

Still another object of the present invention is to provide a light scanning type confocal optical device or light scanning device, which has a small number of reflection surfaces, such that detection sensitivity is improved.

Additional objects and advantages of the invention will be set forth in the specification which follows, and in part will be obvious from the description, or may be learned by practice of the invention. The objects and advantages of the invention may be realized by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments below, serve to explain the principles of the invention.

FIG. 1 shows a light scanning type confocal optical device having a light scanning device, according to the first embodiment of the present invention.

FIG. 2 shows an electrostatically driving type driving mirror with a gimbal structure, which may be applied to the device shown in FIG. 1, so as to enable the device to scan light two-dimensionally.

FIG. 3 shows waveforms of voltages for swinging the driving mirror of FIG. 2.

FIG. 4 shows an electrostatically driving type driving mirror, which may be applied to the device shown in FIG. 1, so as to enable the device to scan light one-dimensionally.

FIG. 5 shows a galvano-mirror, which may be applied to the device shown in FIG. 1, so as to enable the device to scan light one-dimensionally.

FIG. 6 shows a light scanning type confocal optical device having a light scanning device, according to the second embodiment of the present invention.

FIG. 7 shows a light scanning type confocal optical device having a light scanning device, according to the third embodiment of the present invention.

DETAILED DESCRIPTION OF THE INVENTION

Figure 8:
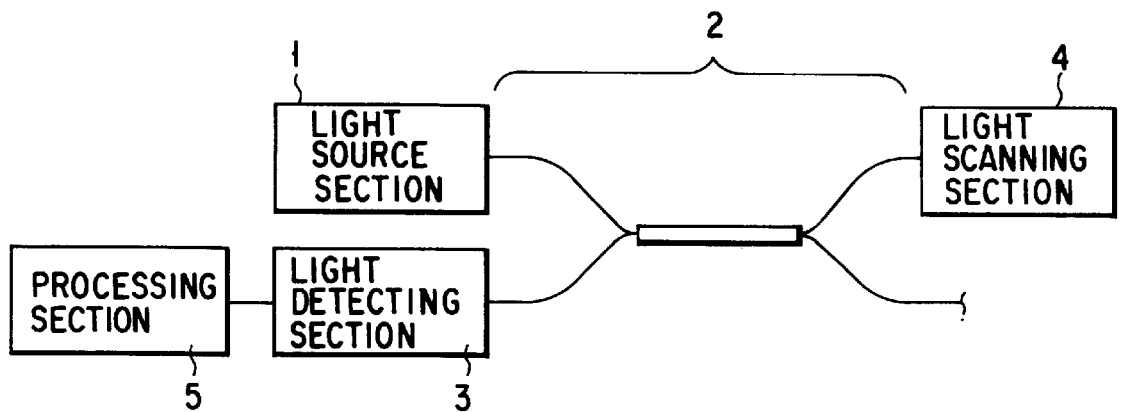
FIG. 8 schematically shows the structure of a conventional light scanning type micro-confocal microscope.
Figure 9:
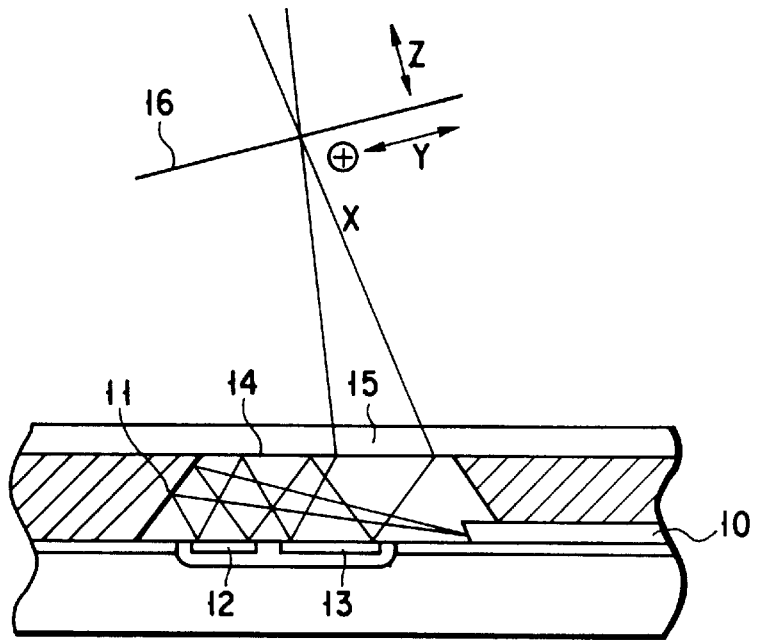
FIG. 9 is a side view of a scanning section of the microscope of FIG. 8.

FIG. 1 shows a light scanning type confocal optical device having a light scanning device, according to the first embodiment of the present invention. Referring to FIG. 1, the optical device comprises a light source section 112, a light transmitting section 114, a light scanning section 116, a light detecting section 118, and a processing section 120.

The light source section 112 is constituted by, e.g., a laser oscillator. The light transmitting section 114 comprises, e.g., a four-terminal coupler 212 for sorting incident light and detected light, and four optical fibers 214, 216, 218 and 220 connected to the four-terminal coupler 212. The light scanning section 116 has a movable mirror 122, a fixed mirror 126 and a converging lens 130. The processing section 120 processes data on the basis of scanned information and data from the light detecting section 118.

The light source section 112 and the four-terminal coupler 212 are optically connected to each other by the optical fiber 214. The light scanning section 116 and the four-terminal coupler 212 are optically connected to each other by the optical fiber 216. The light detecting section 118 and the four-terminal coupler 212 are optically connected to each other by the optical fiber 218. The optical fiber 220 connected to the four-terminal coupler 212 has a free end, and is subjected to non-reflection processing.

The movable mirror 122 has a light transmission region, e.g., an opening 124 at its center, and is supported to be swingable about at least one axis. The fixed mirror 126 is fixedly supported by an optically transparent plate 128, such as a glass plate. A reflection surface of the movable mirror 122 is located opposite to a reflection surface of the fixed mirror 126. Accordingly, the fixed mirror 126 reflects the light passing through the opening 124 toward the reflection surface of the movable mirror 122, and then the movable mirror 122 reflects the light reflected from the fixed mirror 126 toward the converging lens 130. The conversing lens 130 converges the light transmitted from the movable mirror 122 through the plate 128 onto an object surface 132.

The optical fiber 216 is a step index type optical fiber having a core and a clad, more preferably, a single mode fiber having a small core diameter. The core of an end face of the optical fiber 216 is substantially regarded as a point light source. Furthermore, a confocal optical system is provided such that the core of the end face has a conjugate relationship with a focal point of the converging lens 130. The core of the end face substantially functions as a confocal pinhole in the confocal optical system.

The movable mirror 122 is supported in a manner varying in accordance with the scanning method required for measurement. For example, when scanning is one-dimensionally performed, the movable mirror 122 is supported to be swingable about one axis. In other words, it is swung about the axis to achieve one-dimensional scanning. When scanning is two-dimensionally performed, the movable mirror 122 is supported to be swingable about two perpendicular axes. In other words, it is swung about the axes to achieve two-dimensional scanning. Needless to say, it may be supported to be swingable about two axes, and swung about one of the axes to achieve one-dimensional scanning.

The light from the light source section 112 reaches the four-terminal coupler 212, and then the coupler 212 transmits half of the light to the light scanning section 116 through the optical fiber 216. The light from the optical fiber 216 passes through the opening 124, and is reflected by the fixed mirror 126 toward the reflection surface of the movable mirror 122. The light from the reflection surface of the movable mirror 122 is incident on the converging lens 130, and is then converged onto the object surface 132 due to a refracting function of the converging lens 130.

The light incident on the object surface 132 is reflected irregularly therefrom in accordance with the shape and reflectance, etc. of the object. Of the irregularly reflected light, the light incident onto the converging lens 130 is transmitted to the movable mirror 122, and reflected therefrom to the fixed mirror 126. Then, the light reflected from the fixed mirror 126 reaches the end face of the optical fiber 216. In other words, part of the light reflected from the object surface 132 strikes on and passes through the converging lens 130, and the light passed through the lens travels to the end face of the optical fiber 216, after being reflected by the movable mirror 122 and then by the fixed mirror 216 and passing through the opening 214, while being converged by a refracting function of the converging lens 130.

The light returned from the light scanning section 116 is transmitted from the end face of the optical fiber 216 to the core thereof, and then reaches the four-coupler 212 through the optical fiber 216. The coupler 212 transmits half of the light to the light detecting section 118 through the optical fiber 218. The light detecting section 118 detects the waveform and intensity, etc. of the light as information of the light, and sends the information to the processing section 120. The processing section 120 processes the information along with driving data of the movable mirror 122, to thereby obtain data such as the intensity of detected light at respective positions of the object surface 132.

Needless to say, the structure of the confocal optical device according to the first embodiment may be modified variously. For example, in the above-mentioned structure, optical scanning is achieved due to swinging of the mirror 122. However, such a structure may be modified as follows: the mirror 122 is fixed, and the mirror 126 is swung in order to perform optical scanning. Alternatively, both the mirrors 122 and 126 may be swingably supported, and swung about perpendicular axes to achieve two-dimensional scanning.

According to the first embodiment, when the confocal optical device is inserted into the living body through the endoscope, the insertion direction of the device accords with the view direction of the confocal optical system, in which the inside of the living body is viewed with the system. Therefore, the light scanning section 116 can be easily and accurately moved in a direction perpendicular to the object surface 132.

Furthermore, in the first embodiment, the number of reflection surfaces is only two. In other words, only the movable mirror 122 and fixed mirror 126 have reflection surfaces. Accordingly, the degree of the attenuation of light which occurs due to reflection is small, and thus lowering of the detection sensitivity can be greatly restricted.

Next, a driving mirror, which may be applied for the above mentioned confocal optical device, will be explained. It is a specific structural unit, and includes the movable mirror 122. To be more specific, in this specification, the driving mirror means a functional unit or a device including a movable mirror capable of being swung and driving means for swinging the movable mirror.

FIG. 2 shows an electrostatically driving type driving mirror for scanning light two-dimensionally, which is applied to the confocal optical device according to the first embodiment.

In the driving mirror, a reflection surface-holding portion 142 is supported by a pair of torsion bars 144 connected to an inner frame 146, and the inner frame 146 is supported by a pair of torsion bars 148 connected to an outer frame 150. The pair of torsion bars 144 and the pair of torsion bar 148 can be elastically twisted about their perpendicular axes. Due to this structure, the reflection surface holding portion 142 can be swung about the axis of the pair of torsion bars 144 relative to the inner frame 146, and also swung about the axis of the pair of torsion bars 148 relative to the outer frame 150.

On the reflection surface holding portion 142, a +X electrode 152 and a −X electrode 154 are formed, functioning as an optical reflection surface. They are connected to electrodes 160 and 162 by wiring patterns 156 and 158 extending on the inner frame 146, respectively. On the inner frame 146, a +Y electrode 164 and a −Y electrode 166 are formed, and connected to electrodes 172 and 174 by wiring patterns 168 and 170, respectively.

Furthermore, the above structural unit is provided with one ground electrode (not shown) which is located opposite to the +X electrode 152, the −X electrode 154, the +Y electrode 164 and the −Y electrode 166.

When a voltage is applied between the +X electrode 152 and the ground electrode, an electrostatic force generates which has a value proportional to the absolute value of the applied voltage, and the +X electrode 152 is attracted toward the ground electrode. Similarly, when a voltage is applied between the −X electrode 154 and the ground electrode, the −X electrode 152 is attracted toward the ground electrode by a generated electrostatic force having a value proportional to the absolute value of the applied voltage. Accordingly, when voltages having different values (different absolute values) are applied to the +X electrode 152 and the −X electrode 154, respectively, the reflection surface-holding portion 142 is twisted about the axis of the pair of torsion bars 144 (referred to as a Y axis in the first embodiment), and the reflection surface (the +X electrode 152 and −X electrode 154) is deflected about the Y axis.

Therefore, the reflection surface (the +X electrode 152 and the −X electrode 154) is periodically swung about the Y axis, and the light reflected from the reflection surface is scanned in a reciprocating manner along the axis of the pair of torsion bars 148 (which is referred to as an X axis), when alternating voltages which have opposite phases with a minimum voltage of 0V are applied to the +X electrode 152 and the −X electrode 154, respectively. For example, the above is achieved, when an alternating voltage, which is represented by a solid line in FIG. 3, is applied to the +X electrode 152, and an alternating voltage, which is represented by a broken line in FIG. 3, is applied to the −X electrode 154.

Similarly, voltages having different values are applied to the +Y electrode 164 and the −Y electrode, respectively, to thereby swing the reflection surface holding portion 142 about the X axis. As a result, the reflection surface (the +X electrode 152 and the −X electrode 154) is deflected about the X axis, and the light reflected from the reflection surface is scanned along the Y axis.

Therefore, the light reflected from the reflection surface (the +X electrode 152 and the −X electrode 154) is two-dimensionally scanned (e.g., raster-scanned), by applying voltages having opposite phases and varying periodically as shown FIG. 3 to the +X electrode 152 and the −X electrode 154, and applying voltages, which have opposite phases and vary in a linear fashion over time, to the +Y electrode 164 and the −Y electrode 166.

Next, an electrostatically driving type driving mirror for scanning light one-dimensionally will be explained with reference to FIG. 4, which may be applied to the confocal optical device according to the first embodiment, instead of the driving mirror of FIG. 2.

The driving mirror shown in FIG. 4 is a structural unit having one swinging function, whereas the driving mirror in FIG. 2 has two swinging functions. In other words, it has a similar structure to that of FIG. 2, apart from that it does not include the inner frame 146 of the driving mirror of FIG. 2.

More specifically, the reflection holding portion 142 is supported by the pair of torsion bars 144 connected to the outer frame 150, which can be elastically twisted about the axis of the pair. Due to this structure, it can be swung about the axis of the pair relative to the outer frame 150.

On the reflection surface holding portion 142, the +X electrode 152 and the −X electrode 154 are formed, functioning as a reflection surface, and connected to the electrodes 160 and 162 by the wiring patterns 156 and 158. In addition, one ground electrode (not shown) is provided opposite to the +X electrode 152 and the −X electrode 154.

The reflection surface (the +X electrode 152 and the −X electrode 154) is periodically swung about the Y axis, and the light reflected from the reflection surface is scanned along the X axis in a reciprocating manner.

A galvano-mirror, which is well known as a driving mirror for scanning light one-dimensionally, will be explained with reference to FIG. 5 and may be applied to the confocal optical device according to the first embodiment.

A galvano-mirror 190 has a reflecting member 192 which has an opening 124 formed in its center, and which is fixed to a shaft of a galvano-motor 194. The galvano-mirror 190 is the same as a well known general galvano-mirror, with the exception of the following feature: the opening 124 is formed in the center of the reflecting member 192. Accordingly, the reflecting member 192 is swung around the shaft 196 by the galvano-motor 194 as in the general galvano-mirror, whereby reflected light is scanned in a reciprocating manner in an imaginary plane perpendicular to the shaft 196.

FIG. 6 shows a light scanning type confocal optical device having a light scanning device, according to the second embodiment.

In FIG. 6, identical structural elements to those in FIG. 1 are denoted by the same reference numerals, and their explanations will be omitted. The scanning section 116 of the second embodiment differs in structure from the optical scanning section 116 of the first embodiment. The other structural elements are completely the same as those of the first embodiment. Accordingly, their operations are also the same.

The optical scanning section 116 has a movable mirror 122, a fixed mirror 126 and a converging lens 130. The converging lens 130 is a plano-convex lens, and the fixed mirror 126 is provided on a flat surface of the converging lens 130. The fixed mirror 126 is formed of a metal film. To be more specific, a metal film is selectively formed on the flat surface of the converging lens 130 by, e.g., deposition, thereby forming the fixed mirror 126.

The reflection surface of the movable mirror 122 is located opposite to that of the fixed mirror 126. The fixed mirror 126 reflects the light passing through the opening 124 toward the reflection surface of the movable mirror 122, and the movable mirror 122 reflects the light from the fixed mirror 126 toward the converging lens 130. The converging lens 130 converges the light from the movable mirror 122 onto the object surface 132.

The confocal optical device of the second embodiment has a smaller number of structural elements than the confocal optical device of the first embodiment. In this regard, it is advantageous.

FIG. 7 shows a light scanning type confocal optical device having a light scanning device, according to the third embodiment.

In FIG. 7, identical structural elements to those in FIG. 1 are denoted by identical reference numerals, and their explanation will be omitted. The confocal optical device of the third embodiment are completely the same as the confocal optical device of the second embodiment, except for the position of the core of the end face of the optical fiber 216, which functions as a confocal pinhole. Therefore, its operation is also the same.

More specifically, according to the third embodiment, the optical fiber 216 extends through the opening 124 of the movable mirror 122, and the core of the end face of the optical fiber 216, which as mentioned above, serves as the confocal pinhole, is located between the movable mirror 122 and the fixed mirror 126.

The reflection surface of the movable mirror 122 is opposite to that of the fixed mirror 126. The fixed mirror 126 reflects the light emitted from the optical fiber 216 toward the reflection surface of the movable mirror 122, and the movable mirror 122 reflects the light from the fixed mirror 126 toward the converging lens 130. The converging lens 130 converges the light from the movable mirror 122 onto the object surface 132.

By virtue of the above structure, in the optical device of the third embodiment, there is no possibility that the light emitted from the optical fiber 216 may be incident on and returned by some portion of the opening 124. In this regard, the optical device of the third embodiment is advantageous.

Additional advantages and modifications will readily occur to those skilled in the art. Therefore, the invention in its broader aspects is not limited to the specific details and representative embodiments shown and described herein. Accordingly, various modifications may be made without departing from the sprit or scope of the general inventive concept as defined by the appended claims and their equivalents.

What is claimed is:

1. A light scanning device for converging light from a light source onto a surface of an object to be detected, and for scanning the light over the surface, comprising:
    a first reflection surface having a transmission region for allowing the light emitted from the light source to pass through the transmission region;
    a second reflection surface for reflecting the light passing through the transmission region toward the first reflection surface;
    a converging lens for converging the light reflected from the first reflection surface onto the surface of the object; and
    driving means for swinging at least one of the first and second reflection surfaces.

2. The light scanning device according to claim 1, wherein the second reflection surface and the transmission region of the first reflection surface are located on an optical axis of the converging lens.

3. The light scanning device according to claim 1, wherein the driving means and the at least one of the first and second reflection surfaces swung by the driving means are included in an electrostatically driving mirror capable of scanning light two-dimensionally.

4. A light scanning type confocal optical device comprising:
    a light source for emitting light;
    a light scanning section for converging the light emitted from the light source onto a surface of an object to be detected so as to form a light spot, and for scanning the light spot over the surface;
    a confocal pinhole provided between the light source and the scanning section, such that light that passes through the confocal pinhole substantially behaves as light from a point light source, and such that a confocal optical system is formed between the confocal pinhole and the surface of the object, and
    a light detecting section for detecting a part of the light scanned by the light scanning section which is returned from the surface of the object,
    wherein the light scanning section comprises:
        a first reflection surface having a transmission region for allowing the light emitted from the light source to pass through the transmission region;
        a second reflection surface for reflecting the light passing through the transmission region toward the first reflection surface;
        a converging lens for converging the light reflected from the first reflection surface onto the surface of the object; and
        driving means for swinging at least one of the first and second reflection surfaces.

5. The confocal optical device according to claim 4, further comprising an optical fiber for transmitting the light emitted from the light source to the light scanning section, so that the light from the light source is directed onto the second reflection surface from an end face of the optical fiber.

6. The confocal optical device according to claim 5, wherein the optical fiber includes a core extending through the optical fiber, and the end face of the core substantially functions as the confocal pinhole.

7. The confocal optical device according to claim 6, wherein the transmission region of the first reflection surface comprises an opening, and the optical fiber extends through the opening, such that the end face of the core of the optical fiber is located between the first and second reflection surfaces.

8. The confocal optical device according to claim 4, wherein the second reflection surface and the transmission region of the first reflection surface are located on an optical axis of the converging lens.

9. The confocal optical device according to claim 4, wherein the driving means and the at least one of the first and second reflection surfaces swung by the driving means are included in an electrostatically driving mirror capable of scanning light two-dimensionally.

* * * * *